United States Patent [19]
Tomita

[11] 4,239,572
[45] Dec. 16, 1980

[54] METHOD AND APPARATUS FOR FOLDING AND WELDING THE MARGINAL EDGES OF A COVER SHEET

[75] Inventor: Keiji Tomita, Tondabayashi, Japan

[73] Assignee: Kabushiki Kaisha Tomita Sangyo, Osaka, Japan

[21] Appl. No.: 25,145

[22] Filed: Mar. 29, 1979

[51] Int. Cl.³ .................. B32B 3/04; B31B 1/52
[52] U.S. Cl. .................. 156/227; 69/21; 69/33; 156/273; 156/380; 156/479; 428/121; 493/133; 493/162; 493/189
[58] Field of Search .......... 93/36 SQ, 49 R, 84 R, 93/49 M; 156/216, 227, 273, 380, 475, 477 B, 479; 69/21, 33; 428/121

[56] References Cited

U.S. PATENT DOCUMENTS

| | | | |
|---|---|---|---|
| 1,894,592 | 1/1933 | Kilmer | 428/121 X |
| 3,101,602 | 8/1963 | Tosi | 428/121 X |
| 3,147,172 | 9/1964 | Wesa et al. | 156/216 X |
| 4,019,944 | 4/1977 | Tomita | 156/380 |

*Primary Examiner*—John T. Goolkasian
*Assistant Examiner*—Robert A. Dawson
*Attorney, Agent, or Firm*—Griffin, Branigan & Butler

[57] ABSTRACT

A cover sheet is disposed over a recess in a work table. A folding apparatus, including an edge folder and edge erector is disposed over the recess and lowered until the edge erector is in the recess. The edge erector includes horizontally movable plates which are moved outwardly against the edges of the recess to erect the marginal edges of the sheet. The edge folder has downwardly depending, horizontally moving members. The edge folder is lowered until the members touch the work table after which the members are moved inwardly to fold the erected marginal edges of the sheet horizontally over the plates. The plates are then withdrawn while the edge folder members are maintained in contact with the folded marginal edges, and high frequency heat applied to weld the folded marginal edges to the sheet. After the welding is completed the edge erector and edge folder are raised to their initial position and the members are returned to their outward positions.

7 Claims, 12 Drawing Figures

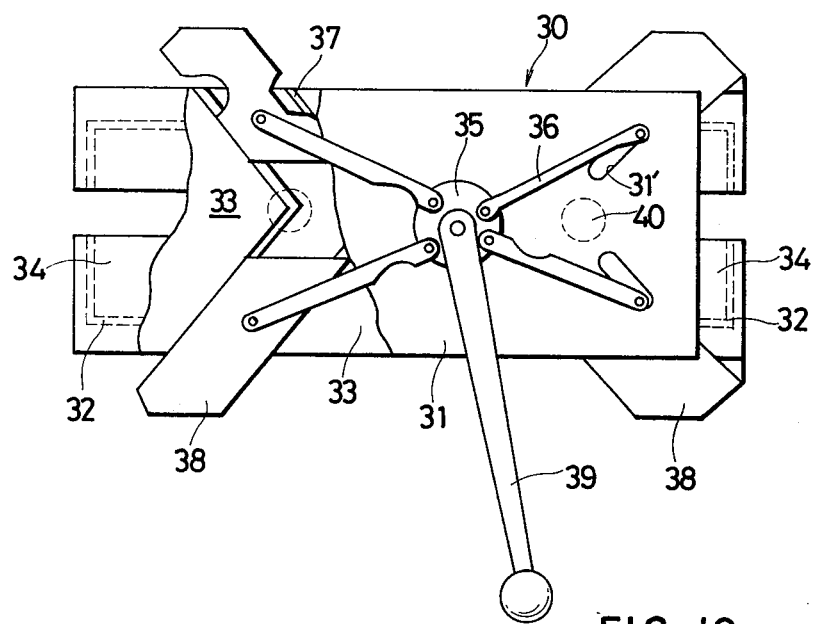
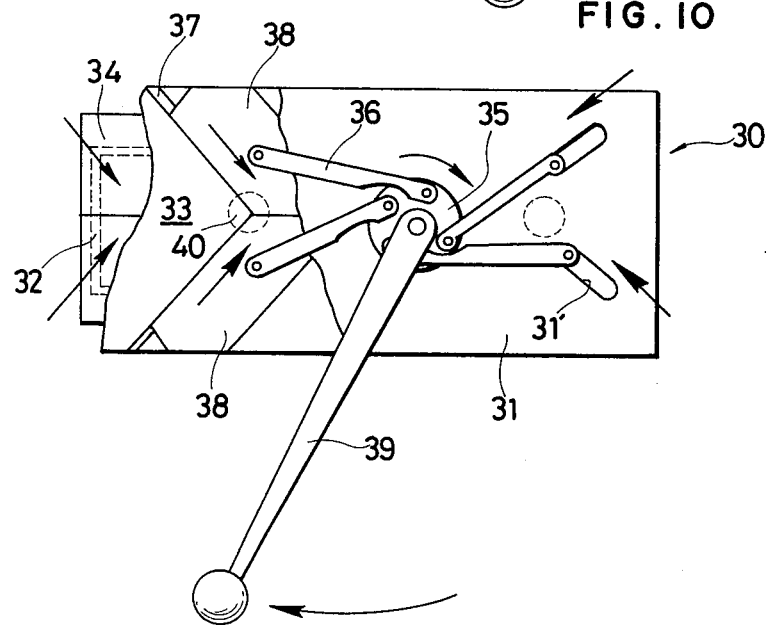

METHOD AND APPARATUS FOR FOLDING AND WELDING THE MARGINAL EDGES OF A COVER SHEET

BACKGROUND OF THE INVENTION

This invention relates to a method of, and apparatus for, folding and welding the marginal edges of a cover sheet to the sheet itself.

It has long been known to provide a cover sheet used as a material for bags or the like, where the marginal edges have been folded and attached for ornamental as well as reinforcement purposes. However, it has been the usual practice to perform the operation manually, and in some cases the marginal edges have been bound by sewing.

U.S. Pat. No. 4,019,944 discloses the folding and welding of a cover sheet about a base material.

SUMMARY OF THE INVENTION

An object of the present invention is to provide a method and apparatus for folding the marginal edges of a sheet material, then welding the folded marginal edges to the sheet itself without an intermediate base material.

An object of the present invention is to provide an apparatus for folding the marginal edges of a sheet material, including a table means having a recess therein over which a sheet material may be placed; an edge erecting means having a plurality of horizontally movable erecting frames; an edge folding means having a plurality of horizontally movable folding frames; resilient connection means for resiliently connecting the edge folding means to the edge erecting means, the connecting means supporting the edge erecting means above the recess; and, means for moving the edge folding means and the edge erecting means vertically.

Another object of the invention is to provide an apparatus as described above and further comprising means for outwardly extending the horizontally movable erecting frames in the recess to press the erecting frames against the lateral walls of the recess with the sheet material therebetween to thereby erect the marginal edges.

A further object of the invention is to provide an apparatus as described above wherein the means for drawing the folding frames inwardly comprises means for folding the marginal edges against the erecting frames, and means for moving the erecting frames inwardly of the erecting means while contact is maintained between the folding frames and the folded marginal edges whereby contact is maintained between the folded marginal edges and the unfolded portion of the sheet material.

A further object of the invention is to provide an apparatus as described above and further comprising high frequency generator means for heating the folded marginal edges while in contact with the unfolded portion of the sheet material.

Another object of the invention is to provide a method for folding and welding the marginal edges of a sheet material said method comprising the steps of providing a table with a recess therein; disposing a sheet material over the recess; lowering a set of erecting frames into the recess until the erecting frames press the sheet material against the bottom of the recess; horizontally extending the erecting frames to press the sheet material against lateral edges of the recess to vertically erect the marginal edges of the sheet material; lowering a set of folding frames onto the surface of the table adjacent the recess; drawing the folding frames inwardly toward the recess to fold the erected marginal edges horizontally; drawing the erecting frames inwardly while the folding frames are still in contact with the folded marginal edges whereby the folded marginal edges are brought into surface contact with the unfolded portion of the sheet material; applying heat from a high frequency generator to the folded marginal edges to weld the folded marginal edges to the unfolded portion of the sheet material.

Other objects of the invention and its mode of operation will become apparent upon consideration of the following description and the accompanying drawings.

BRIEF DESCRIPTION OF DRAWINGS

FIGS. 9 and 10 are partially cut-away top views of the edge folding means in an opened and a closed position, respectively; and, FIGS. 11 and 12 are partially cut-away top views of the edge erecting means in an opened and a closed position, respectively.

DESCRIPTION OF A PREFERRED EMBODIMENT

Figure 1:
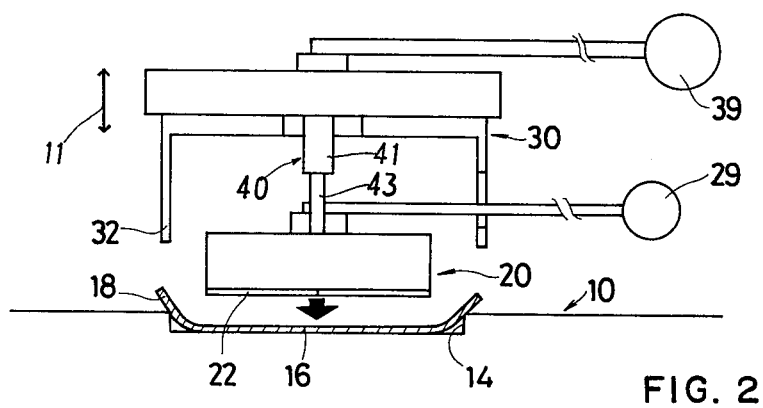
FIGS. 1–5 are diagrammatic views showing sequential steps in the operation of the apparatus used to carry out the method according to the present invention.

As schematically illustrated in FIG. 1, a preferred embodiment of the invention comprises a table means 10, a marginal edge erecting means 20 and a marginal edge folding means 30. A press device (not shown) is provided for supporting the edge folding means 30, and for moving the edge folding means 30 in a vertical path as indicated by the arrow 11. The press device is provided with a high frequency welder, also not shown. The press device and the high frequency welder are of well known construction hence their details are not shown herein.

Table means 10 is provided with a rectangular recess 14 in its upper surface, the recess having dimensions approximating the desired final dimensions of a cover sheet 16.

Figure 6:
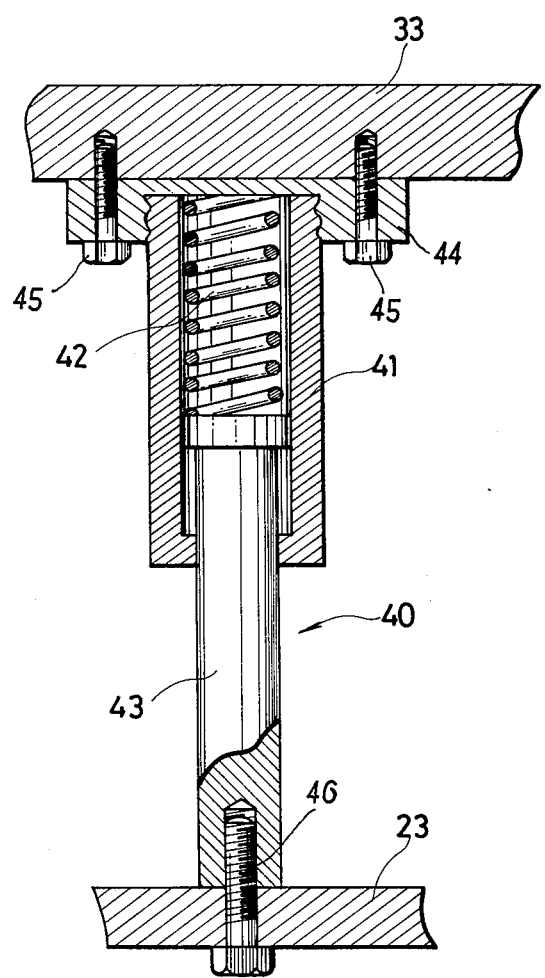
FIG. 6 is a side view, partly in section of a resilient linkage means utilized to suspend an edge erecting means from an edge folding means.
Figure 7:
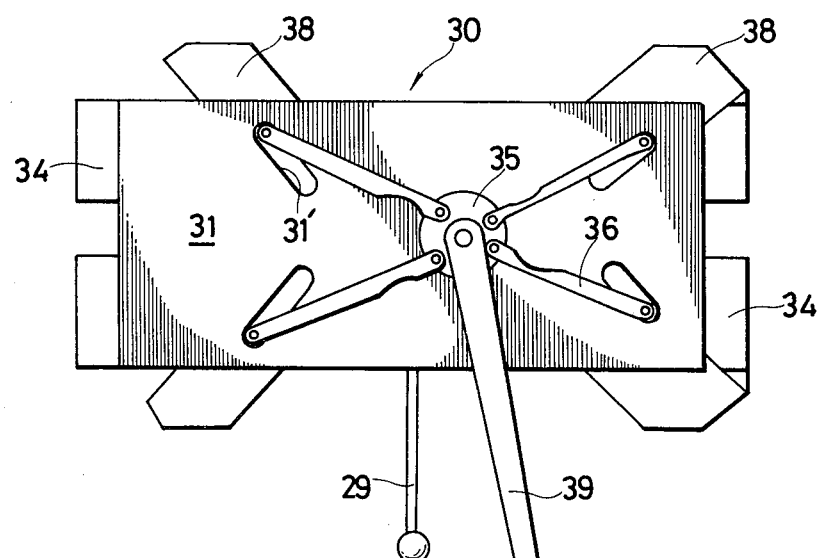
FIG. 7 is a top view of FIG. 1.
Figure 8:
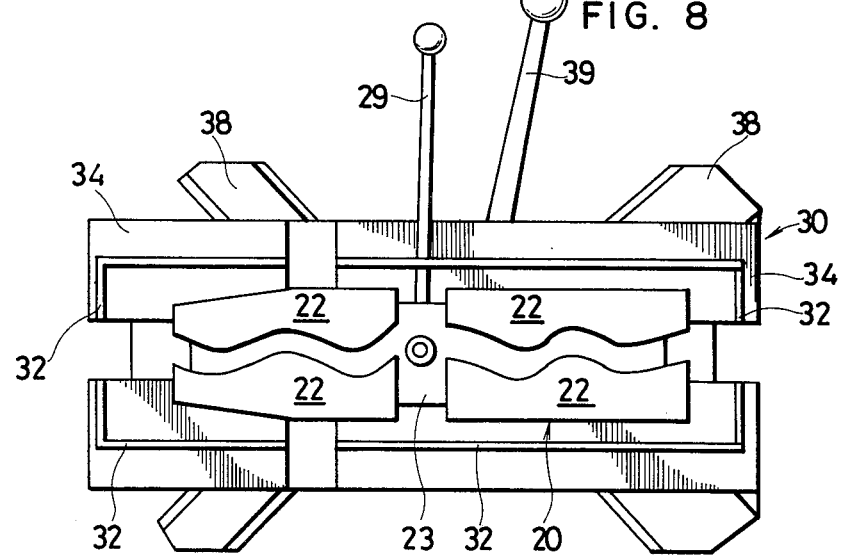
FIG. 8 is a bottom view of FIG. 1.

The edge erecting means 20 is supported underneath edge folding means 30 by a plurality of resilient linkage means 40, only one of which is visible in FIG. 1. As illustrated in FIG. 6, a resilient linkage means 40 comprises a sleeve 41, a compression spring 42 and a piston 43. The piston 43 is inserted into sleeve 41, the head end of the piston going in last. Spring 42 is then inserted into the sleeve. A mounting bracket 44 is attached to an intermediary plate 33 by bolts 45 and a threaded upper end of sleeve 41 is screwed into a threaded hole provided in bracket 44. The lower end of piston 43 is attached to a plate 23 by a bolt 46.

The plate 23 of FIG. 6 comprises a part of the edge erecting means 20 while the plate 33 comprises a part of the edge folding means 30. Thus, even though edge erecting means 20 is carried or supported by the edge folding means 30, the folding means may still move in a vertical direction even though the erecting means may be pressed downwardly against a cover sheet. The apparatus is preferably provided with two resilient linkage means 40 positioned as best shown in FIGS. 9 and 10.

Figure 11:
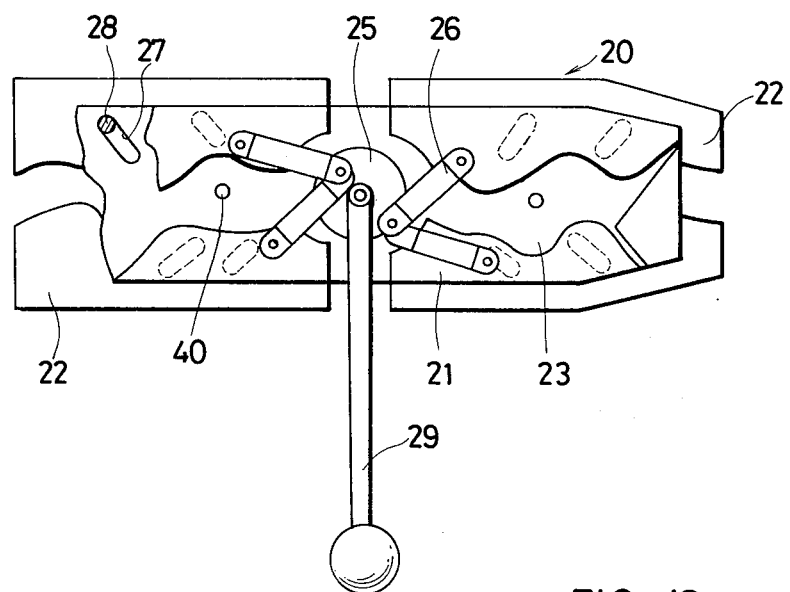
Figure 12:
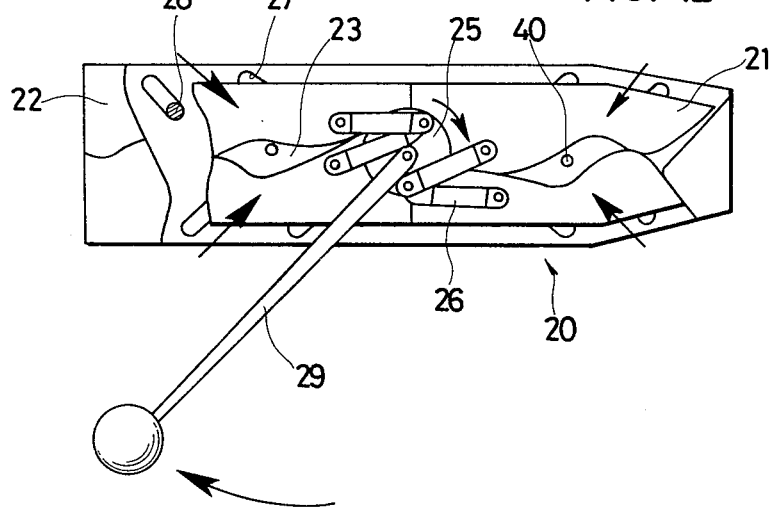

As shown in FIGS. 11 and 12, the edge erecting means 20 comprises the plate 23, four horizontally movable lower frames 22 made of Bakelite or another insulating material, and four horizontally movable upper plates 21. The plate 23 is provided with a central aperture into which a disc 25 is loosely fitted. A handle 29 is rigidly connected to disc 25 to rotate the disc as the handle is moved in a horizontal plane.

Four linkage members 26 are provided, each member being pivotally connected at one end to disc 25 and at the other end to an individual one of the plates 21. Each plate 21 is provided with a plurality of downwardly extending pins 28. The pins 28 for each plate 21 extend through guide slots 27 in plate 23 and connect with a corresponding one of the lower frames 22. Thus, as handle 29 is rotated between the positions illustrated in FIGS. 11 and 12, this motion is transmitted through disc 25 and linkages 26 to the upper plates 23, moving them between the two positions illustrated in FIGS. 11 and 12. The motion of each plate 21 is transmitted through pins 28 to a lower frame 22 so that the frames 22 are also moved between the positions illustrated in FIGS. 11 and 12.

As illustrated in FIGS. 7–10 the edge folding means 30 comprises an upper plate 31 as well as a lower plate means 33. Upper plate 31 is provided with an aperture for receiving a loosely fitting disc 35. Four linkages 36 are pivotally attached at one end to disc 35 and at the other end each linkage is connected by a pivot pin extending through a slot 31' to one of four sliders 38. The lower plate means 33 is provided with grooves 37 which receive downwardly depending lugs (not shown) on the sliders 38. In addition, plate means 33 is rigidly secured by any suitable means (not shown) to the upper plate 31.

The edge folding means 30 further comprises four horizontally movable frames 34, each having a downwardly extending angle member 32. As illustrated in FIG. 1, at least one member 23 must have a cut-out through which the handle 29 of the edge erecting means 20 may extend. Each frame 34 is operatively attached, by its horizontal portion, to one of the sliders 38 by any suitable means (not shown) so as to move therewith.

Figure 2:
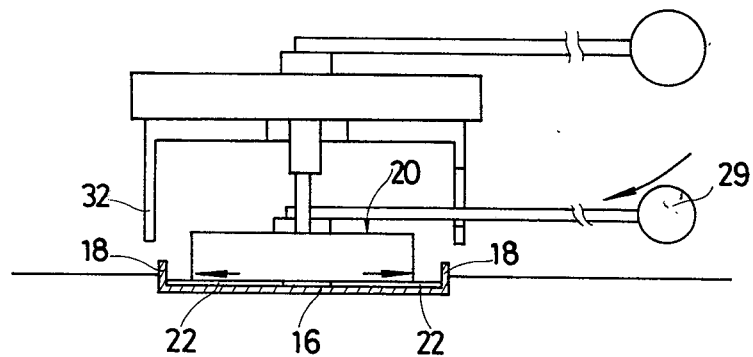

The device is utilized as follows. A sheet of material 16, which is to be the folded cover sheet, is disposed over recess 14 as illustrated in FIG. 1. Next, a press or other means, not shown, lowers the erecting means 20 and folding means 30 until the frames 22 on the bottom of the erecting means rest lightly on the sheet material as illustrated in FIG. 2. The handle 29 is rotated to horizontally extend frames 22 as described above. The pressure of the lateral faces of frames 22 against the sides of recess 14 cause erection of the marginal edges of sheet material 16.

Figure 3:
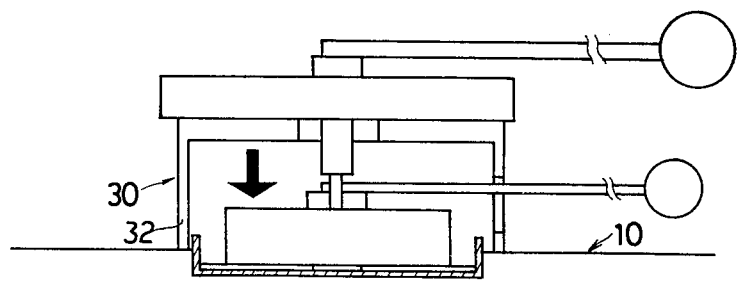
Figure 4:
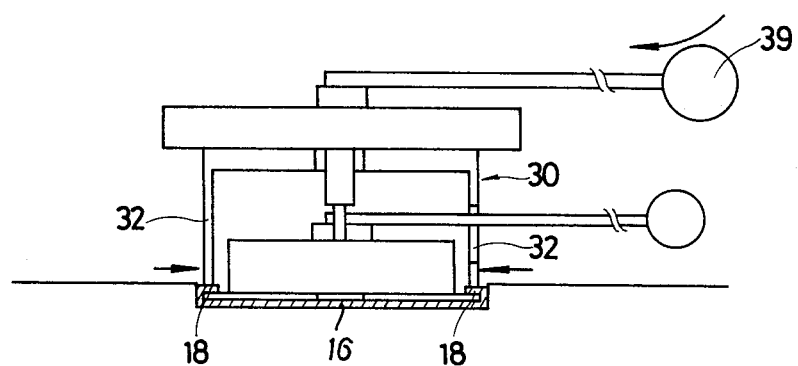

Folding means 30 is then lowered as illustrated in FIG. 3 until the downwardly depending angle members 32 rest on the surface of table means 10. Because of the resilient connection shown in FIG. 6 erection means 20 does not move in the vertical direction at this time as the folding means is lowered. Next, the handle 39 is rotated. As handle 39 is rotated from the FIG. 9 toward the FIG. 10 position, linkages 36 draw sliders 38 inwardly of the assembly. Since frames 34 with their downwardly depending angle members 32 are operatively connected to sliders 38, the members 32 are drawn inwardly. As illustrated in FIG. 4, the members 32 fold the edges 18 of sheet material 16 inwardly and horizontally over the still extended frames 22.

Figure 5:
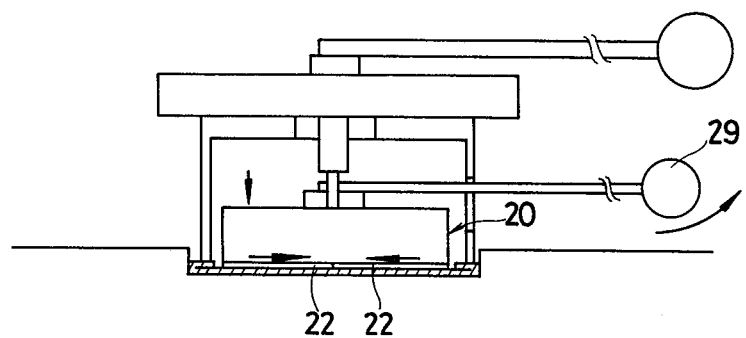

While members 32 still contact the edges 18, handle 29 is moved in the reverse direction to draw the frames 22 horizontally inwardly, as illustrated in FIG. 5. At this point a high electrical frequency heat generator (not shown) may apply heat to the folded edges 18 to weld the folded marginal edges to the upper surface of the unfolded portion of sheet 16. After the welding operation, the folding means 30 and erecting means 20 are raised to their initial position (FIG. 1) and handle 39 is rotated to again move the members 32 outwardly. The device is then ready for another cycle.

From the foregoing description it is seen that the present invention provides a simple yet efficient method and means for folding and welding the marginal edges of a sheet to the sheet itself. The invention is suitable for use in folding and welding vinyl or other sheet material, as long as the material is weldable. It is also suitable for use in folding and welding natural leather material which has been coated with a composite resin.

While a preferred embodiment of the invention has been described in detail, it will be obvious to those skilled in the art that various modification and substitutions may be made in the described embodiment without departing from the spirit and scope of the invention as defined by the appended claims.

I claim:

1. Apparatus for folding the marginal edges of a sheet material upon itself, said apparatus comprising:
   a table means having a recess therein over which a sheet material may be placed;
   an edge erecting means having a plurality of horizontally movable erecting frames;
   an edge folding means having a plurality of horizontally movable folding frames;
   resilient connection means for resiliently connecting said edge folding means to said edge erecting means, said connecting means supporting said edge erecting means above said recess; and,
   means for moving said edge folding means and said edge erecting means vertically.

2. Apparatus as claimed in claim 1 and further comprising means for outwardly extending said horizontally movable erecting frames in said recess to press said erecting frames against the lateral walls of said recess with said sheet material therebetween to thereby erect said marginal edges.

3. Apparatus as claimed in claim 2 and further comprising means for drawing said movable folding frames inwardly of said folding means to fold said erected marginal edges horizontally.

4. Apparatus as claimed in claim 3 wherein the means for drawing said folding frames inwardly comprises means for folding said marginal edges against said erecting frames, and means for moving said erecting frames inwardly of said erecting means while contact is maintained between said folding frames and said folded marginal edges whereby contact is maintained between said folded marginal edges and the unfolded portion of said sheet material.

5. Apparatus as claimed in claim 3 or claim 4 and further comprising high frequency generator means for heating said folded marginal edges while in contact with said sheet material.

6. A method for folding the marginal edges of a sheet material upon itself said method comprising the steps of:
   providing a table with a recess therein;

disposing said sheet material over said recess;

lowering a set of erecting frames into said recess until said erecting frames press said sheet material against the bottom of said recess;

horizontally extending said erecting frames to press said sheet material against lateral edges of said recess to vertically erect the marginal edges of said sheet material;

lowering a set of folding frames onto the surface of said table adjacent said recess;

drawing said folding frames inwardly toward said recess to fold said erected marginal edges horizontally; and, drawing said erecting frames inwardly while said folding frames are still in contact with said folded marginal edges whereby said folded marginal edges are brought into surface contact with the unfolded portion of said sheet material.

7. A method as claimed in claim 6 and further comprising the step of applying heat from a high frequency generator to said folded marginal edges to weld said folded marginal edges to said unfolded portion of said sheet material.

* * * * *